UNITED STATES PATENT OFFICE 2,149,260

METHOD OF PREPARATION OF DINITROETHYLENEUREA

Henry A. Aaronson, Dover, N. J.

No Drawing. Application August 22, 1938,
Serial No. 226,204

6 Claims. (Cl. 260—309)

(Granted under the act of March 3, 1883, as
amended April 30, 1928; 370 O. G. 757)

The invention described herein may be manufactured and used by or for the Government for governmental purposes, without the payment to me of any royalty thereon.

This invention relates to a method of preparation of dinitroethyleneurea.

Heretofore dinitroethyleneurea has been prepared only by the use of very strong nitric acid and a maximum yield of from 53 to 60 percent. has been obtained.

I have discovered that by the use of mixed nitric and sulphuric acids under proper conditions a yield of 92 to 95 percent. may be obtained.

As an example one part by weight of ethyleneurea is slowly sifted into approximately ten parts of a mixed acid having a composition approximating sulphuric acid 68.5 percent., nitric acid 22 percent., and water 9.5 percent. During the addition of the ethyleneurea the temperature of the reaction mixture is maintained preferably below 10° C. The nitration is continued preferably below 2° C. for two hours, although excellent yields can be obtained if the nitration mixture is maintained below 30° C. and the nitration period is limited to one hour. The reaction mixture may then be filtered and the separated solid washed with cold water, or the mixture may be drowned in several volumes of cold water and then filtered.

The advantages claimed for the new process are: About a 50 percent increase in yield, greater economy due to the use of cheap mixed acid in place of expensive strong nitric acid alone, and greater economy due to the fact that about one-half as much actual nitric acid is required to get the increased yield.

I claim:

1. A method of preparation of dinitroethyleneurea which comprises adding one part of ethyleneurea to ten parts of mixed acid consisting of sulphuric acid 68.5%, nitric acid 22%, and water 9.5%, maintaining the temperature of the reaction mixture below 10° C. during addition of the ethyleneurea, continuing the nitration for one to two hours while maintaining the nitration mixture below 30° C., drowning the mixture in cold water and then filtering.

2. A method of preparation of dinitroethyleneurea which comprises adding one part of ethyleneurea to ten parts of mixed acid consisting of sulphuric acid 68.5%, nitric acid 22%, and water 9.5%, maintaining the temperature of the reaction mixture below 10° C. during addition of the ethyleneurea, continuing the nitration for one to two hours while maintaining the nitration mixture below 30° C., filtering the reaction mixture and washing the separated solid with cold water.

3. A method of preparation of dinitroethyleneurea which comprises adding one part of ethyleneurea to ten parts of mixed acid consisting of sulphuric acid 68.5%, nitric acid 22%, and water 9.5%, maintaining the temperature of the reaction mixture below 10° C. during addition of the ethyleneurea, continuing the nitration for one to two hours while maintaining the nitration mixture below 30° C.

4. A method of preparation of dinitroethyleneurea which comprises adding one part of ethyleneurea to ten parts of mixed acid consisting of sulphuric acid 68.5%, nitric acid 22%, and water 9.5%, maintaining the temperature of the reaction mixture below 10° C. during addition of the ethyleneurea, continuing the nitration for two hours while maintaining the nitration mixture below 2° C.

5. A method of preparation of dinitroethyleneurea which comprises adding one part of ethyleneurea to ten parts of mixed acid consisting of sulphuric acid 68.5%, nitric acid 22%, and water 9.5%, maintaining the temperature of the reaction mixture below 10° C. during addition of the ethyleneurea, continuing the nitration for one hour while maintaining the nitration mixture below 30° C.

6. A method of preparation of dinitroethyleneurea which includes the steps of adding one part of ethyleneurea to ten parts of mixed acid consisting of sulphuric acid 68.5%, nitric acid 22%, and water 9.5%, and maintaining the temperature of the reaction mixture below 10° C. during addition of the ethyleneurea.

HENRY A. AARONSON.